United States Patent [19]

Michael

[11] 4,373,622

[45] Feb. 15, 1983

[54] FLOATING MANIFOLD

[75] Inventor: Richard A. Michael, Waterloo, Iowa

[73] Assignee: Deere & Company, Moline, Ill.

[21] Appl. No.: 200,858

[22] Filed: Oct. 27, 1980

[51] Int. Cl.³ .................. F16D 25/06; F16L 27/02
[52] U.S. Cl. .................. 192/85 AA; 92/106; 192/85 R; 285/190
[58] Field of Search .......... 192/85 A, 85 AA, 85 AB, 192/85 AT, 85 R; 92/106; 285/190; 277/30, 173

[56] References Cited

U.S. PATENT DOCUMENTS

| | | | |
|---|---|---|---|
| 1,779,076 | 10/1930 | Ray | 277/173 X |
| 1,879,633 | 9/1932 | Olsen et al. | 92/106 X |
| 2,230,881 | 2/1941 | Browne | 285/190 X |
| 2,624,599 | 1/1953 | Eaton | 277/30 |
| 2,719,620 | 10/1955 | McDonald | 192/85 AT |
| 3,001,806 | 9/1961 | Macks | 277/173 X |
| 3,082,009 | 3/1963 | Whitley et al. | 277/30 X |
| 3,753,478 | 8/1973 | Shiber | 192/85 AA |

*Primary Examiner*—Rodney H. Bonck

[57] ABSTRACT

This invention relates to a floating manifold capable of transferring hydraulic fluid between a stationary member and a rotatable member. The floating manifold is comprised of a collar axially aligned onto a portion of the rotatable member, a passage means extending radially into the collar for the passage of a hydraulic fluid, and attachment means mounted on the outer periphery of said collar for permitting limited axial and rotational movement of the collar relative to the stationary member.

6 Claims, 2 Drawing Figures

FLOATING MANIFOLD

BACKGROUND OF THE INVENTION

1. Field of the Invention

This invention relates to a floating manifold capable of transferring a fluid between a stationary member and a rotatable member and more particularly to a floating manifold for transferring hydraulic oil between a stationary transmission case and a rotatable traction clutch.

2. Description of the Prior Art

Generally, manifolds are employed in drive train assemblies wherein they function in hydraulically connecting two members together. These manifolds are normally located between a stationary transmission case and a rotatable clutch assembly having an annular piston actuated by hydraulic oil. The clutch assembly, which is concentrically positioned on a transmission shaft, is sealed to the interior surface of the manifold by metal sealing rings. Such sealing rings can only tolerate a small amount of eccentricity between the two members. One method used for controlling the amount of eccentricity entailed mounting the rotating clutch housing on a set of bearings. The bearings would support the rotatable clutch housing in the stationary housing and maintain adequate concentricity with the rigid manifold. However, this method did not lend itself to applications where the clutch was mounted directly to the engine flywheel as is common in the automotive field.

So mounting the clutch directly to the engine flywheel is convenient and saves transmission space. When the engine and clutch are to be joined directly to the transmission case, the sealing rings must enter the manifold but there is no way to guide the sealing rings into the manifold to avoid damage to the sealing rings. For these reasons, automotive applications normally use lever activated clutches, having a throw out bearing, instead of hydraulically activated clutches actuated with annular pistons. When it was attempted to mount a hydraulically activated clutch, having a rotatable annular piston, directly to the engine flywheel, the sealing rings tended to cantilever off the end of the engine crankshaft. This cantilever effect would accentuate crankshaft deflections caused by the engine firing forces as well as other concentricity errors and together, these forces and errors would result in failure of the manifold.

Now a floating manifold has been invented which will join a hydraulically activated clutch which is mounted to an engine flywheel, directly to a stationary transmission case.

SUMMARY OF THE INVENTION

Briefly, this invention relates to a floating manifold capable of transferring a hydraulic fluid between a stationary transmission case and a rotatable traction clutch. The floating manifold comprises a collar, passage means extending radially into said collar and attachment means mounted on the outer periphery of said collar for permitting limited axial and rotational movement of the collar relative to the stationary transmission case.

The rotatable traction clutch, which is connected via a flywheel to an engine, includes a rotatable clutch cover which houses a full annular piston, a pressure plate and multiple clutch discs and separator plates. The rotatable clutch cover has an outwardly extending circular lip onto which the floating manifold is axially positioned. Hydraulic oil which is contained in the stationary transmission case flows via a hydraulic line into the floating manifold and through the radially located passage means. Once within the floating manifold, the hydraulic fluid is directed through a passageway contained in the rotatable clutch cover to one side of the full annular piston. The hydraulic fluid then activates the full annular piston to move the pressure plate so as to bring the clutch discs into contact with the separator plates.

The attachment means mounted on the outer periphery of the collar permits limited axial movement of the floating manifold relative to the stationary transmission case while allowing enough freedom of rotational and translational movement to correct for any concentricity errors or deflections resulting from the engine firing forces.

The general object of this invention is to provide a floating manifold. A more specific object of this invention is to provide a floating manifold for transferring hydraulic oil between a stationary transmission case and a rotatable traction clutch.

Another object of this invention is to provide a floating manifold for connecting a stationary housing to a rotatable clutch which has enough freedom of movement to float with the movement of the rotating clutch.

Still another object of this invention is to provide a simple and economical floating manifold.

A further object of this invention is to provide a floating manifold which will facilitate the assembly and disassembly of a clutch housing to and from a transmission case.

Other objects and advantages of the present invention will become more apparent when considered in connection with the following description and the drawings.

DETAILED DESCRIPTION OF THE PREFERRED EMBODIMENT

Figure 1:
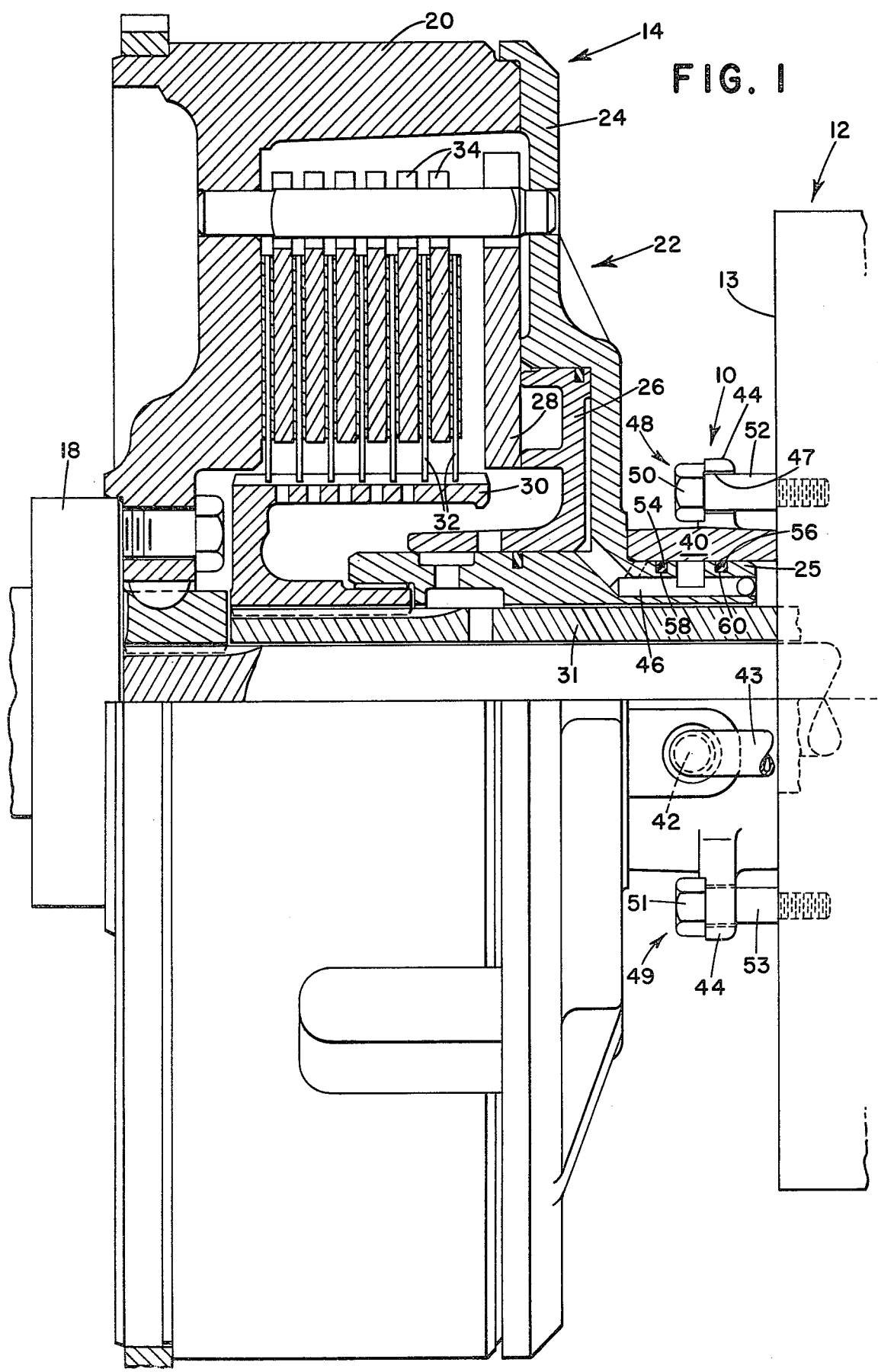
FIG. 1 is a partially sectioned assembly view of a floating manifold positioned between a rotatable clutch and a stationary transmission case.
Figure 2:
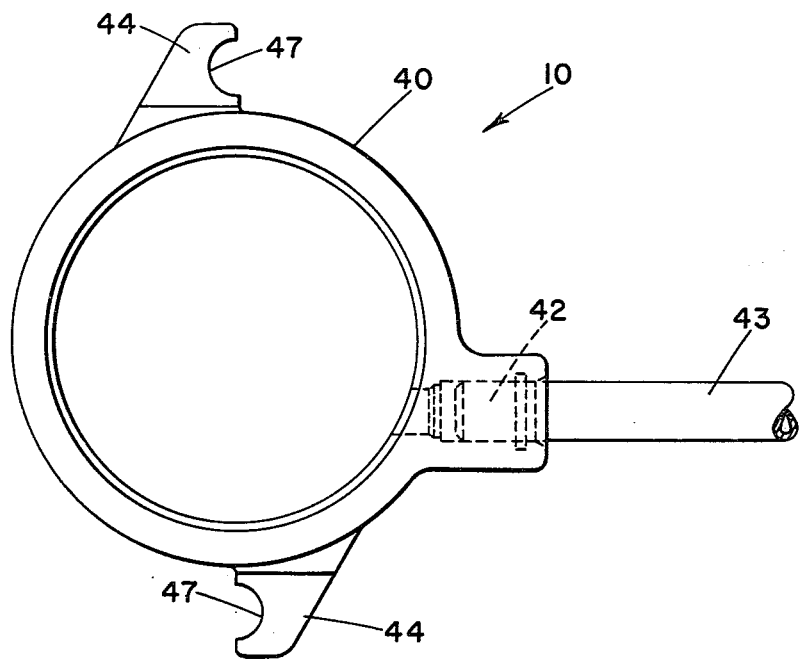
FIG. 2 is an end view of the floating manifold shown in FIG. 1.

Referring to the figures, a floating manifold 10 is shown hydraulically connecting a stationary member 12, such as a transmission case, to a rotatable member 14, such as a rotatable traction clutch. The stationary member 12 has an end surface 13 which contacts one end of the floating manifold 10. In a drive train assembly, the rotatable member 14 is secured to an engine crankshaft 18. The rotatable member 14 is normally made up of a flywheel 20 and a clutch 22. The clutch 22 includes a clutch cover 24 with an outward extending lip 25, a full annular piston 26, a pressure plate 28, a clutch hub 30 which is splined to a transmission input shaft 31, multiple clutch discs 32 and separator plates 34. As the full annular piston 26 is hydraulically activated, it causes the pressure plate 28 to move inward thereby causing the clutch discs 32 to engage with the separator plates 34. This action causes the clutch 22 to be engaged.

The floating manifold 10 is comprised of a circular collar 40, passage means 42 and attachment means 44. The collar 40 is constructed to be annularly positioned about the outward extending lip 25 of the clutch cover 24. This annular positioning allows the floating manifold 10 to float or rotate on this outward extending lip 25. The passage means 42, which is preferably a single through hole, extends radially into the collar 40 for the purpose of conveying a fluid therethrough. Typically, hydraulic oil stored in a section of the stationary member 12 is transferred to the floating manifold 10 via a hydraulic line 43. The hydraulic line 43 is secured to the stationary housing 12 and is sealably attached to the floating manifold 10.

Once the hydraulic oil is within the floating manifold 10, it enters an internal passageway 46 which directs the hydraulic oil to one side of the full annular piston 26.

Located on the outer periphery of the collar 40 are the attachment means 44. The attachment means 44 are formed in the shape of latching tongues each having a concave surface 47. Each of the concave surfaces 47 is designed to abut a shaft portion 52 and 53 of aligning bolts 48 and 49 respectively. Preferably, each of the concave surfaces 47 will face in the direction of rotation of the engine crankshaft 18. This assures that the concave surfaces 47 will be urged into contact with the shaft portions 52 and 53 of the bolts 48 and 49 respectively by the movement of the engine crankshaft 18 and the extended lip 25. This abuting action limits the rotational motion in one direction while allowing movement of the collar 40 in the reverse direction when needed. Any movement in the reverse direction during the operation of the drive train will be small, just enough to correct for any deflections or concentricity errors.

The attachment means 44 makes it possible to first position the floating manifold 10 on the extended lip 25 of the clutch 22. After joining the engine and transmission case, the collar 40 is then rotated on the extended lip 25 so that the attachment means 44 contact the bolts 48 and 49 which are already screwed into the stationary member 12. Head portions 50 and 51 on the bolts 48 and 49, respectively, limit the axial movement of the floating manifold 10 outward toward the clutch 22. Axial movement of the floating manifold 10 inward toward the stationary member 12 is restricted by the width of the collar 40 which abuts the end surface 13 of the stationary member 12. In addition to the attachment of the stationary member 12 to the clutch 22 via the floating manifold 10, the stationary member 12 is normally bolted to the engine by an outer periphery flange, not shown.

Sealing means 54 and 56, such as conventional cast iron or metal sealing rings, are positioned in grooves 58 and 60 located in the outer periphery of the outward extending lip 25. These sealing means 54 and 56 fluidly seal the inner surface of the circular collar 40 to the outer surface of the outward extending lip 25.

An additional feature of the attachment means 44 is that it enables the rotatable member 14 to be disconnected from the stationary member 12 without removing the floating manifold 10 therefrom. This is possible because the latching tongues 44 are indexed behind the head portion 50 and 51 of the bolts 48 and 49 instead of being securely fastened to them. This indexing design allows the floating manifold 10 to be separated from the stationary member 12 without removing any bolts.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A floating manifold capable of transferring a fluid between a stationary member and a rotatable member comprising:
   (a) a collar annularly positioned about a portion of said rotatable member;
   (b) passage means extending radially into said collar for passage of said liquid; and
   (c) attachment means mounted on the outer periphery of said collar for juxtapositioning said collar to said stationary member, said attachment means limiting rotational movement only in one direction of said collar on said rotatable member while permitting limited axial movement of said collar on said rotatable member relative to said stationary member.

2. A floating manifold for transferring pressurized oil between a stationary member and a rotatable member, wherein the rotatable member has an outward extending circular lip, said floating manifold comprising:
   (a) a circular collar annularly positioned about said outward extending circular lip;
   (b) a passageway extending radially into said collar for conveying said pressurized oil; and
   (c) latching tongues mounted on the outer periphery of said circular collar capable of juxtapositioning said collar to said stationary member, said latching tongues limiting rotational movement in one direction of said collar on said outward extending circular lip while permitting limited axial movement of said collar on said outward extending circular lip relative to said stationary member.

3. In combination with a stationary member, a rotatable clutch secured to a rotatable flywheel, a full annular piston enclosed in said clutch cover, said clutch comprising a rotatable clutch cover with an outward extending lip, a pressure plate indirectly connected to multiple clutch discs and actuated by said full annular piston, and a floating manifold positioned between said stationary member and said rotatable clutch, said floating manifold comprising:
   (a) a circular collar annularly positioned on said outward extending lip of said rotatable clutch;
   (b) passage means extending radially into said collar for conveying a hydraulic oil between said stationary member and said annular piston; and
   (c) latching tongues mounted to the outer periphery of said circular collar capable of juxtapositioning said collar to said stationary member, said latching tongues limiting rotational movement in one direction of said circular collar on said outward extending lip while permitting limited axial movement of said circular collar on said outward extending lip relative to said stationary member.

4. In combination with a stationary transmission case, a rotatable clutch secured to a rotatable flywheel, a full annular piston enclosed in said clutch cover, said clutch comprising a rotatable clutch cover with an outward extending lip, a pressure plate indirectly connected to multiple clutch discs and actuated by said full annular piston, a floating manifold positioned between said stationary transmission case and said rotatable clutch, said floating manifold comprising:
   (a) a circular collar axially positioned on said outward extending lip of said rotatable clutch;

(b) a passageway extending radially into said collar through which hydraulic oil is conveyed between said stationary transmission case and said full annular piston; and (c) latching tongues mounted to the outer periphery of said circular collar capable of juxtapositioning said collar to said stationary transmission case, said latching tongues limiting rotational movement in one direction of said circular collar on said outward extending lip while permitting limited axial movement of said circular collar on said outward extending lip relative to said stationary transmission case.

5. A floating manifold capable of transferring a fluid between a stationary member and a rotatable member comprising:

(a) a collar annularly positioned about a portion of said rotatable member;

(b) passage means extending radially into said collar for passage of said liquid; and (c) attachment means mounted on the outer periphery of said collar for juxtapositioning said collar to said stationary member, said attachment means limiting rotational movement in one direction of said collar on said rotatable member while allowing movement of said collar in a reverse direction and permitting limited axial movement of said collar on said rotatable member relative to said stationary member.

6. A floating manifold capable of transferring a fluid between a stationary member and a rotatable member comprising:

(a) a collar annularly positioned about a portion of said rotatable member;

(b) passage means extending radially into said collar for passage of said liquid; and (c) latching tongues mounted on the outer periphery of said collar for juxtapositioning said collar to said stationary member, said latching tongues limiting rotational movement of said collar on said rotatable member while permitting limited axial movement of said collar on said rotatable member relative to said stationary member.

* * * * *